United States Patent [19]

Galvin

[11] 4,134,110

[45] Jan. 9, 1979

[54] TRANSCEIVER WITH SKEWED TRANSDUCERS FOR LOW CLOSE-IN SENSITIVITY

[75] Inventor: Aaron A. Galvin, Lexington, Mass.

[73] Assignee: American District Telegraph Company, New York, N.Y.

[21] Appl. No.: 738,946

[22] Filed: Nov. 4, 1976

[51] Int. Cl.[2] .......................... G08B 13/24; G01S 9/00

[52] U.S. Cl. ....................................... 340/552; 325/15; 340/1 R; 340/558; 343/5 PD

[58] Field of Search ............. 340/16 R, 258 R, 258 A, 340/258 B, 1 R; 343/5 PD, 100 R, 100 AD, 112 CA, 100 CS; 325/15, 21, 22, 29

[56] References Cited

U.S. PATENT DOCUMENTS

| | | | |
|---|---|---|---|
| 2,641,755 | 6/1953 | Bartelink | 343/100 CS |
| 3,096,515 | 7/1963 | McLeod, Jr. | 343/112 |
| 3,394,342 | 7/1968 | Walker | 343/5 PD |
| 3,412,402 | 11/1968 | Beckwith | 343/112 CA |
| 3,778,823 | 12/1973 | Sato et al. | 343/7 ED |
| 3,815,131 | 6/1974 | Dautel et al. | 343/5 PD |
| 3,854,132 | 12/1974 | Davies | 343/5 PD |

*Primary Examiner*—John W. Caldwell, Sr.
*Assistant Examiner*—Joseph E. Nowicki
*Attorney, Agent, or Firm*—Weingarten, Maxham & Schurgin

[57] ABSTRACT

An intruder detection transceiver in which close-in sensitivity is reduced or eliminated to alleviate false alarm problems. An ultrasonic or microwave transceiver contains a transmitter and receiver for transmitting and receiving signals for intruder detection. By mounting the transmitter and receiver at the proper angle with respect to each other, close in sensitivity is reduced without materially affecting sensitivity at greater distances.

7 Claims, 4 Drawing Figures

TRANSCEIVER WITH SKEWED TRANSDUCERS FOR LOW CLOSE-IN SENSITIVITY

FIELD OF THE INVENTION

This invention is related to intrusion alarms and in particular to the transducer placement in intrusion alarm transceivers.

BACKGROUND OF THE INVENTION

Ultrasonic and microwave intrusion alarm systems are known for detecting the presence of an intruder within a protected area and providing an alarm indication in response to such detection. Generally, a continuous acoustic or electromagnetic signal is transmitted into the protected area. The backscatter signal from objects in the protected zone is received; and any movement in the protected area produces a doppler shift in the received signal which is detected to produce an alarm.

Frequently, the transmitting and receiving transducers or antennas are contained within the same housing, and this arrangement is called a transceiver. A housing suitable for such a transceiver is shown in design application Ser. No. 657,709, filed Feb. 12, 1976, now U.S. Pat. Des. No. 243,513, and assigned to the same assignee as the present invention. Although transceivers offer a number of advantages such as ease of mounting, the need for only a single enclosure, and best averaged doppler frequency against an intruder walking in random directions in the protected area, transceivers have the disadvantage of being extremely sensitive to disturbances occurring very close to the transmitting and receiving elements. The "close-in" sensitivity varies approximately as $1/R^4$. Because of the rapid increase in system sensitivity as a target approaches the transceiver, a very small, close-in target will produce the same alarm signal level as a large target further away. As an example, a device which is designed to trigger an alarm when an intruder with a cross-section of approximately one square meter is viewed at a distance of 10 meters, will produce the same response to an insect having a cross-section of $10^{-6}$ square meters located $\frac{1}{3}$ meter from the transceiver. This high close-in sensitivity can produce undesirable false alarms from an intruder-detection system.

One method commonly used to overcome such close-in sensitivity is to separate the transmitting and receiving transducers so that the close-in sensitivity is reduced to an acceptable level, due to the fact that when the close-in target is very near the transmitting transducer, it is not very near the receiving transducer. This method has the disadvantage of requiring larger transceiver enclosures which are more expensive and more difficult to conceal. Another method is to add a pair of baffles to the transceiver, one beside each transducer, to provide a "shadow" in the area of close-in sensitivity. This method has the disadvantage of lowering sensitivity in the direction of the original beam directions. Also, transceivers have been built with transducers which may be tilted and rotated to point towards any particular part of the protected area. The freedom of movement of the transducers in this type of transceiver is to allow the area of coverage of a transceiver to be varied without changing its mounting location; and the problem of close-in sensitivity of such a transceiver frequently is greater than when the transducers are parallel in orientation.

SUMMARY OF THE INVENTION

The present invention includes a scheme by which the close-in sensitivity of an intruder detection transceiver may be reduced. This novel scheme allows the transmitting transducer and the receiving transducer of a transceiver to be mounted in close juxtaposition to one another, resulting in a small, economically-produced, easily-concealed transceiver.

In the present invention, a transmitting transducer and a receiving transducer are mounted with their transmission and reception axes angled with respect to one another. By choosing the proper angle for mounting the transducers, close-in sensitivity may be markedly reduced without materially affecting the transceiver sensitivity to intrusions occurring at greater distances from the transceiver. The present invention effectively and reliably reduces the close-in sensitivity of a transceiver, and hence the resulting false alarms, without requiring complex electronic circuitry or other significant additions to the transceiver, which prior art methods have required. Thus, the present invention simply and economically reduces close-in sensitivity in an intrusion alarm transceiver.

DESCRIPTION OF THE DRAWINGS

These and other advantages of the present invention will become more clear as the following detailed description of the invention is read and referring to the accompanying figures of which.

DETAILED DESCRIPTION OF THE INVENTION

Figure 1:
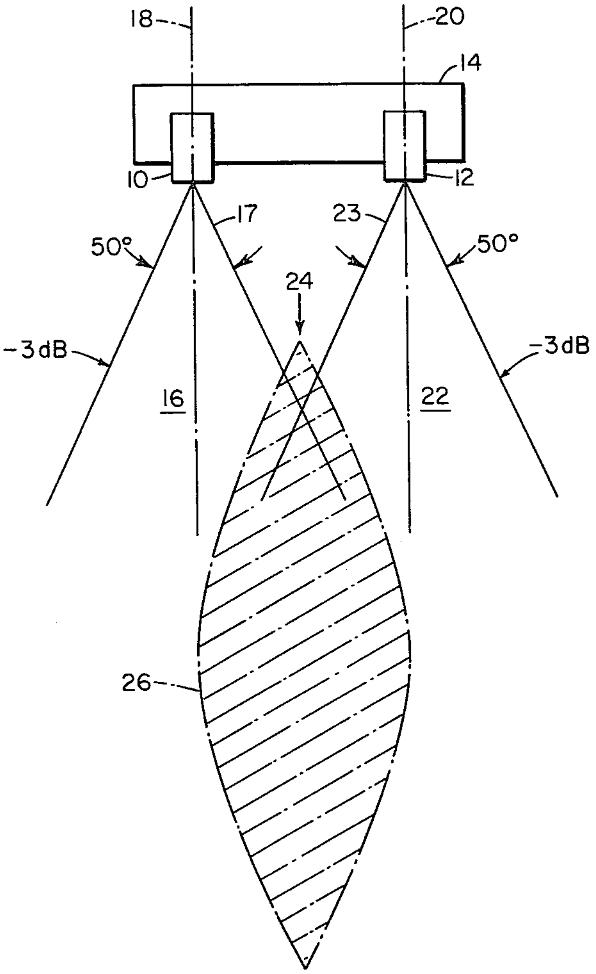
FIG. 1 PRIOR ART
FIG. 1 is a diagram illustrating the supersensitive zone of transceivers having parallel transducers.

Before describing the present invention, a brief summary of the problem and its causes will be helpful. FIG. 1 shows a conventional ultrasonic intruder detection transceiver, including a transmitting transducer 10 and a receiving transducer 12 mounted in a transceiver housing 14 containing the necessary electronics and processing circuitry required for the proper operation of the transceiver. The exact nature of this electronic circuitry is not important to the present invention and is not shown here. Additionally, it should be noted that although the preferred embodiment described herein uses ultrasonic, accoustic waves for detecting intruders, the present invention is equally applicable to microwave or other types of systems. As shown in FIG. 1, transmitting transducer 10 projects a conically-shaped beam about an axis 18. Typically, the location of the −3dB points of beam 16 are located along a conical surface 17 having an apex angle of 50°. Receiving transducer 12 is similarly mounted with its axis 20 parallel to the axis 18 of transmitting transducer 10. In a typical transceiver, the distance between axes 18 and 20 of transducers 10 and 12 is approximately 0.2 meters. The sensitivity of receiving transducer 12 varies as a function of the angle from receiver axis 20; and typically the −3dB point of the receiver sensitivity pattern is located along a conical surface about axis 20 having an apex angle of 50°, similar to the transmitted beam 16 from transmitting transducer 10.

As is well known, the power per unit area in projected beam 16 falls off as $1/R_t^2$ where $R_t$ is the distance from transmitting transducer 10. Similarly, radiation reflected by a target and detected by receiving transducer 12 falls off as $1/R_r^2$, where $R_r$ is the distance to the receiving transducer. The overall sensitivity change with range therefore falls off as $$1/R_t^2R_r^2,$$

and when the distance of an object from transceiver 14 is large compared to the spacing of transducers 10 and 12, the sensitivity falls off approximately as $1/R^4$ where R is the distance between the object and the transceiver 14.

As can be seen from FIG. 1, with transmitting transducer 10 and receiving transducer 12 positioned with their axes 18 and 20 parallel, the transmitting and receiving patterns 16 and 22 intersect at a point relatively close to transceiver 14, as indicated by point 24 in FIG. 1. From this point of intersection of the two beams 16 and 22, and extending for a distance from the transceiver is a region 26, which will be called the supersensitivity zone, in which even a very small object will cause a very high level signal to be returned to receiving transducer 12 due to the $1/R^4$ dependence of transceiver sensitivity on the distance R. The existence of this supersensitive zone 24 makes the transceiver 14 prone to produce false alarms from insects, large pieces of dust, or other small wind-borne objects in this area.

As an example, assume that the transceiver 14 is designed to produce an alarm signal when a man-sized target, typically one meter in cross-section, appears within a distance of 10 meters of the transceiver. The effective size of this target, as viewed by the system when the target moves to a position which is only $\frac{1}{3}$ meter from the transceiver, would be 810,000 square meters were it not for the fact that at this short a range the target angular extent is greater than the angular coverage of the transducers. Taking another point of view, this system would be triggered and produce an alarm signal by a flying insect or other object having a cross-section of only $1.2 \times 10^{-6}$ square meters flying through supersensitive zone 26 at a distance of about one foot from transceiver 14.

Currently, the means which is used to discriminate against such false alarms is to separate the transmitting and receiving transducers sufficiently so that a close-in target cannot be viewed in the region of high sensitivity of both the transducers simultaneously. In practice, in ultrasonic transceivers it has been found that typically it takes a transducer spacing of about 1/6 meter to permit detection of man-size targets at 8 meters without creating a propensity to false alarm on flies, and a spacing of about $\frac{1}{3}$ meter for detecting man-size targets at a maximum range of 11 meters. This factor has prevented prior art transceiver enclosures from being as small as they might otherwise be.

Figure 2:
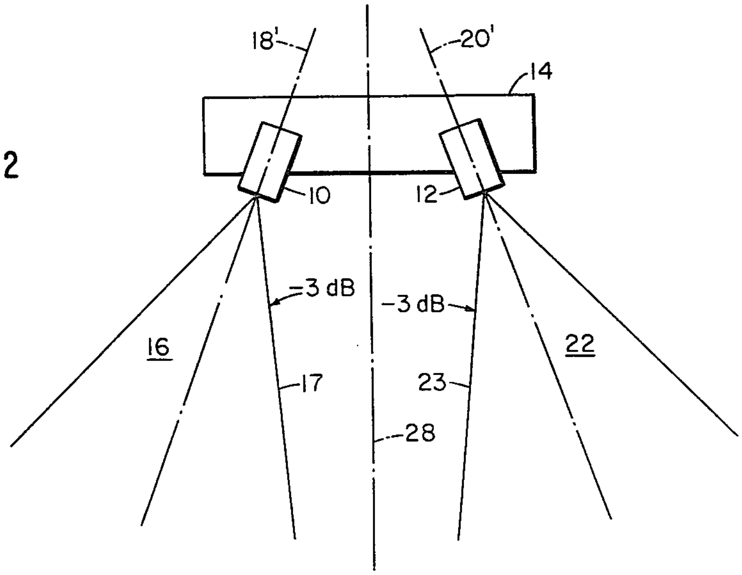
FIG. 2 shows the method used in the present invention to lower close-in sensitivity.

It has been found that by angling the transmitting and receiving transducers by a certain predetermined amount, the effective pattern gain in the critical zone may be reduced without substantially reducing the sensitivity of the transceiver to objects located at a distance from the transceiver. This is shown in FIG. 2 in which a transceiver 14 constructed in accordance with the present invention is depicted. Transceiver 14 contains a transmitting transducer 10 and a receiving transducer 12, as does the prior art transceiver shown in FIG. 1. However, these transducers 10 and 12 are mounted in the transceiver housing 14 with their axes 18' and 21' angled outward symmetrically from their former axes, the direction of which is shown by axis line 28. With the transducer parameters described above, this angle is approximately 20°, although different transducer parameters may result in the optimum angle being anywhere between approximately 10° to 30°. It can be seen from FIG. 2 that the transmitting and receiving patterns, denoted by 3dB lines 17 and 23, intersect at a point which is much farther from transceiver 14 than was the prior point of intersection 24 when the transmitting and receiving transducers 10 and 12 were parallel. Consequently, an object must be much further away from transceiver 14 to be in both beam 16 from transmitting transducer 10 and receiving pattern 22 of receiving transducer 10. As the object moves in closer to the transceiver, it can be seen that the buildup in overall system response is much lower when the transducers are tilted outwards than for the case where the transducers are mounted with their axes parallel. The problem of close-in sensitivity is reduced or eliminated and supersensitivity zone 26 no longer exists.

Figure 3:
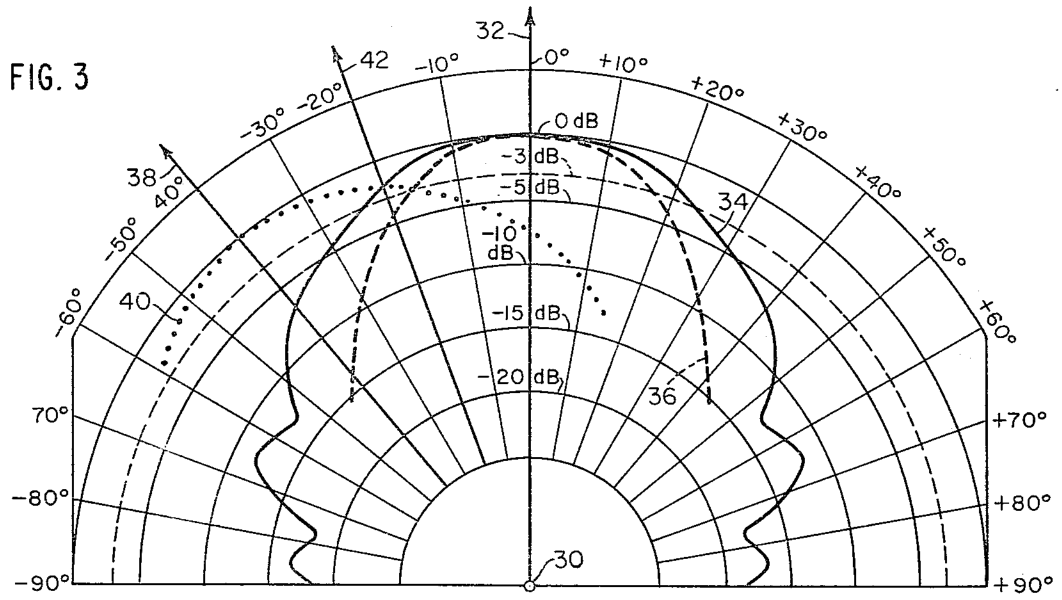
FIG. 3 is a graph showing transducer sensitivity patterns useful in explaining the advantages of the present invention.

The effects of tilting the receiving and transmitting transducers 10 and 12 may be evaluated quantitatively by referring to FIG. 3, which shows radiation patterns useful in explaining the present invention. In the graph of FIG. 3, the angle with respect to origin 30 represents the angle with respect to the transducer; and the radius represents the intensity of the beam 16 from transmitting transducer 10 or the receiver sensitivity of receiving transducer 12. The vertical line labeled 0° in FIG. 3 is the direction of the axes 18 and 20 of the transducers; and the intensity of the transmitted and received patterns as a function of the angle are shown by solid line 34. It should be noted that at an angle of 20° to the axis, the pattern is reduced by 2dB. The 3dB point is displaced 25° from the transceiver axis. The long-range sensitivity of the transceiver at points far from the transceiver with respect to the transducer spacing is the product of the transmitter waveform intensity and the receiver sensitivity. Dashed line 36 in FIG. 3 is the product pattern for two of these transducers pointed in the same direction. This product pattern shows an effective gain which is twice as far down at each angle as the original single pattern 34, when expressed in dB.

To evaluate the effect of angling the transducers, as shown in FIG. 2, axis 38 may be added to FIG. 3 located at an angle of 40° with respect to axis 32. Thus, the angle between axes 32 and 38 correspond to the angle between the axes of transmitting transducer 10 and receiving transducer 12 in FIG. 2. The sensitivity pattern associated with the transducer along axis 38 is shown by dotted line 40, which is identical with pattern 34, except that it is displaced by 40°. The direction denoted by axis 42 midway between axes 32 and 38 corresponds with the axis 28 of the transceiver shown in FIG. 2. It can be seen that along this axis 28, the transmitting and receiving patterns are each down by 2dB, the product of which is the reduction in sensitivity for the transceiver, or 4dB.

Figure 4:
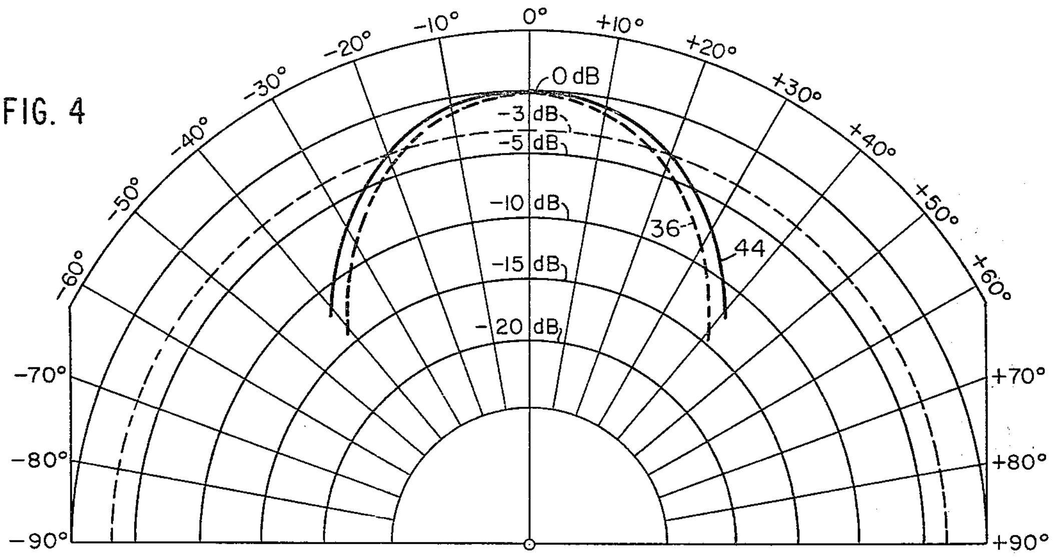
FIG. 4 is a graph comparing the sensitivity patterns of a typical prior art device and the present invention.

FIG. 4 compares the product pattern of a transceiver having parallel transducers with the product pattern of a transceiver having two transducers which are angled apart from one another by 40° (each transducer being tilted from the transceiver axis by 20°). Line 44 is the product pattern for these two angled transducers after increasing the gain at each transducer by 2dB to remove the 4dB loss along the transceiver axis. Dashed line 36 represents the product pattern for two transducers pointing in the same direction. It should be noted that while angling the transducers reduces close-in sensitivity as described above, the long-range product pattern 44 produced by angled transducers is nearly identical with the product pattern 36 resulting from parallel-aligned transducers, thus yielding a detection zone (after increasing the gain of the transmitter and receiver transducers by 2dB) which is nearly the same.

There has been described a method for reducing the close-sensitivity of an intruder detection transceiver having transmitting and receiving transducers located therein. Although the exemplary embodiment described herein uses ultrasonic transducers and receivers for detecting intrusions, the present invention is equally applicable to microwave or other types of systems using electromagnetic or other types of propagated waveforms for detecting objects. It will be appreciated that in applying the teachings of the present application to different situations, modifications will occur to those of ordinary skill in the art which do not fall outside the intended scope of the present invention, and accordingly, the present invention is to be construed only as limited by the appended claims.

What is claimed is:

1. For use in an intruder detection system in which a beam is transmitted into an area to be protected, reflections of the beam from objects in the area are received, and signals representative of the received reflections are processed to detect the presence of an intruder, a transceiver comprising:

a transceiver housing;

a transmitting transducer angularly mounted in said housing;

a receiving transducer angularly mounted in said housing;

said transmitting and receiving transducers being spaced apart in said housing by a predetermined distance and symmetrically disposed on respective opposite sides of a transceiver axis;

each of said transceivers being angularly disposed in said housing outward of said transceiver axis to provide a radiation pattern symmetrical about the transducer axis angularly outward of said transceiver axis;

the outward angular position of said transducers relative to the transceiver axis being of an angular extent providing substantially reduced close-in effective pattern gain and sensitivity of said transceiver and substantially the same detection-zone sensitivity outside of the close-in range, in comparison to a transceiver having parallel aligned transducers of the same spacing and same pattern.

2. The apparatus of claim 1 wherein the transmitting and receiving transducers respectively transmit and receive ultrasonic waves.

3. The apparatus of claim 1 wherein the angle between the transmitting transducer axis and the receiving transducer axis is between 20° and 60°.

4. The apparatus of claim 1 wherein the angle between the receiving and transmitting transducer axes is 40°.

5. The apparatus of claim 1 wherein the transmitting and receiving transducers respectively transmit and receive electromagnetic radiation.

6. The apparatus of claim 1 wherein the close-in sensitivity along the transceiver axis is reduced by about 4dB in comparison to a transceiver having parallel aligned transducers of the same spacing and same pattern.

7. The apparatus of claim 1 wherein the 3dB points of the transducer patterns intersect on the transceiver axis a sufficient distance outward from the transceiver to provide a predetermined close-in sensitivity.

* * * * *

UNITED STATES PATENT AND TRADEMARK OFFICE

CERTIFICATE OF CORRECTION

PATENT NO. : 4,134,110

DATED : January 9, 1979

INVENTOR(S) : Aaron A. Galvin

It is certified that error appears in the above-identified patent and that said Letters Patent are hereby corrected as shown below:

Column 6, Line 7, "transceivers" should read --transducers--

Signed and Sealed this

*Twenty-fifth* Day of *March 1980*

[SEAL]

*Attest:*

SIDNEY A. DIAMOND

*Attesting Officer* *Commissioner of Patents and Trademarks*